F. A KORLASKY.
MACHINE FOR MAKING GRILLE WORK.
APPLICATION FILED JAN. 16, 1914.

1,139,775.

Patented May 18, 1915.
3 SHEETS—SHEET 1.

Witnesses
Wm. H. Mulligan.
C. H. Crawford

Inventor
Frank A. Korlasky,
By Richard Bowen,
his Attorney

F. A KORLASKY.
MACHINE FOR MAKING GRILLE WORK.
APPLICATION FILED JAN. 16, 1914.

1,139,775.

Patented May 18, 1915.
3 SHEETS—SHEET 2.

F. A KORLASKY.
MACHINE FOR MAKING GRILLE WORK.
APPLICATION FILED JAN. 16, 1914.
1,139,775.
Patented May 18, 1915.
3 SHEETS—SHEET 3.
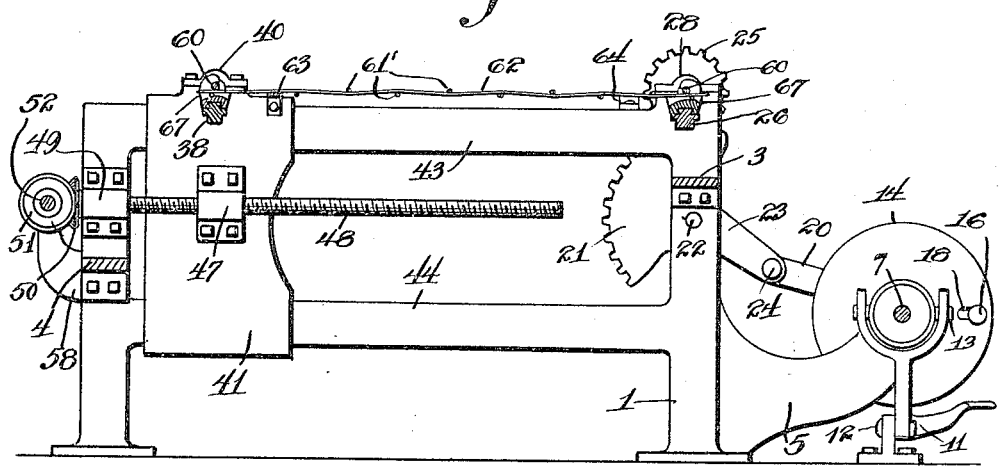
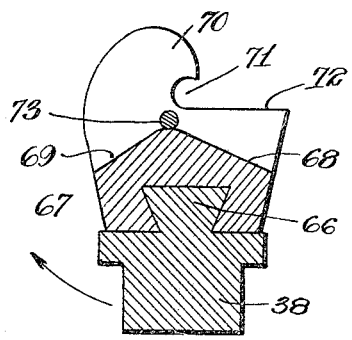
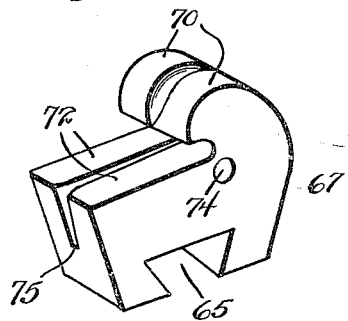
Witnesses
Wm. H. Mulligan.
C. H. Crawford
Inventor
Frank A. Korlasky,
By Richard Bowen,
his Attorney

UNITED STATES PATENT OFFICE.

FRANK A. KORLASKY, OF RHINELANDER, WISCONSIN.

MACHINE FOR MAKING GRILLE WORK.

1,139,775.   Specification of Letters Patent.   Patented May 18, 1915.

Application filed January 16, 1914. Serial No. 812,549.

*To all whom it may concern:*

Be it known that I, FRANK A. KORLASKY, a citizen of the United States, residing at Rhinelander, in the county of Oneida and State of Wisconsin, have invented certain new and useful Improvements in Machines for Making Grille Work, of which the following is a specification.

The object of this invention is to provide a machine for attaching grille rods or wires to a frame in such a manner as to form a grille structure.

A further object is to provide a machine for attaching the ends of a previously formed sheet of grille to a previously formed frame, as regards all sides thereof and as regards all ends of the wires or rods, so as to form a grille structure.

A further object of the invention is to provide a machine which is especially adapted for attaching the opposite ends of grille wires about opposite sides of a grille frame, simultaneously, so that tension will be applied to each wire or grille rod, at both ends thereof thereby avoiding distortion of the grille mesh during its anchorage to the grille frame.

Further objects of the invention will be more fully described in connection with the accompanying drawings and will be more particularly pointed out and ascertained in and by the appended claims.

Figure 1:
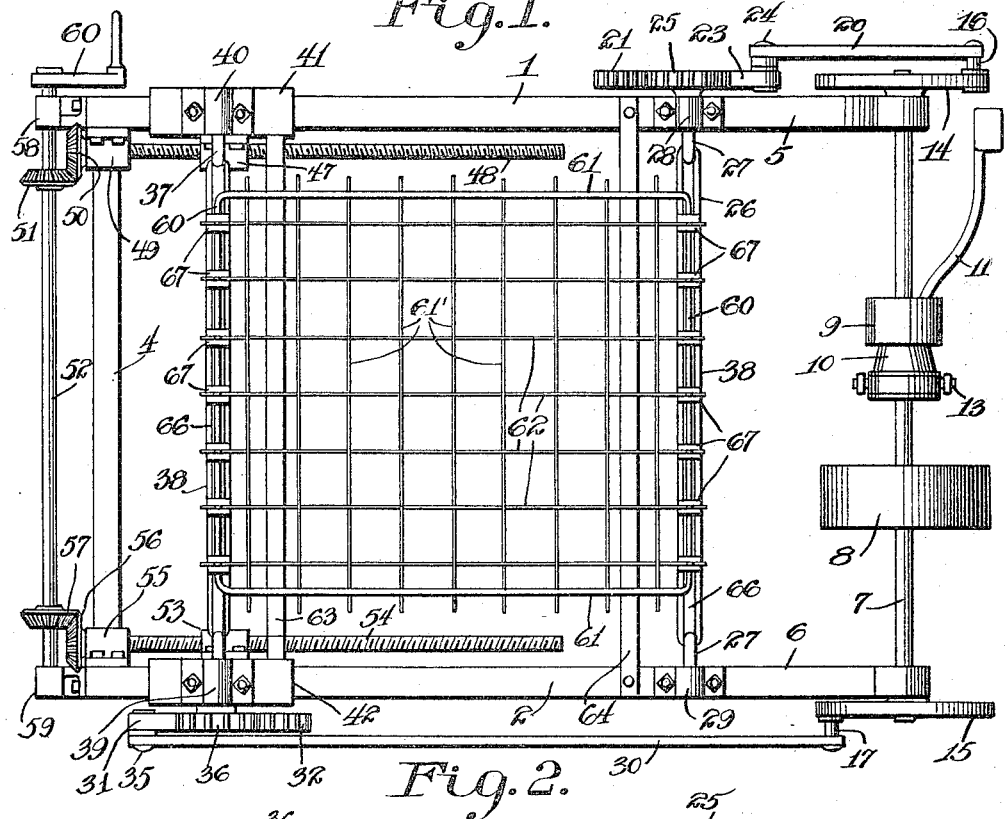
Figure 2:
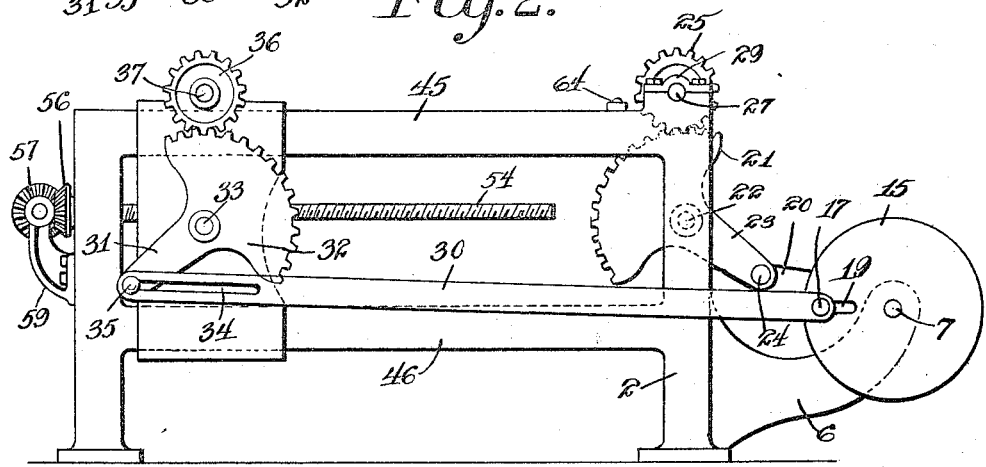
Figure 3:
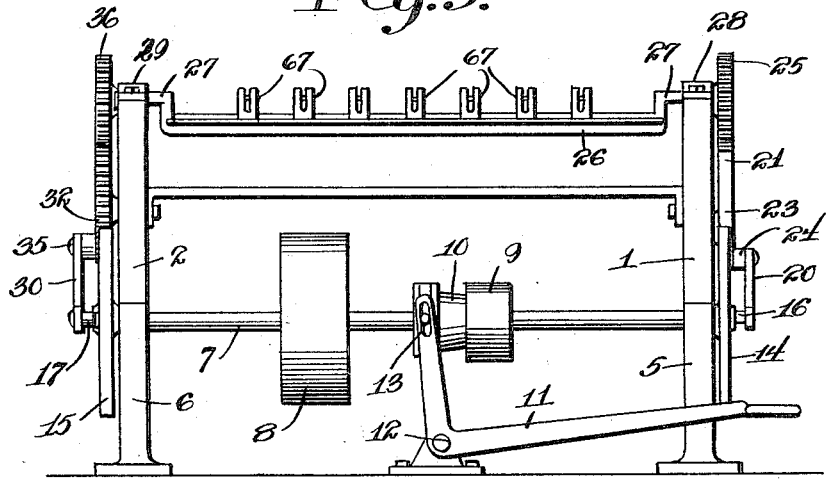
Figure 4:
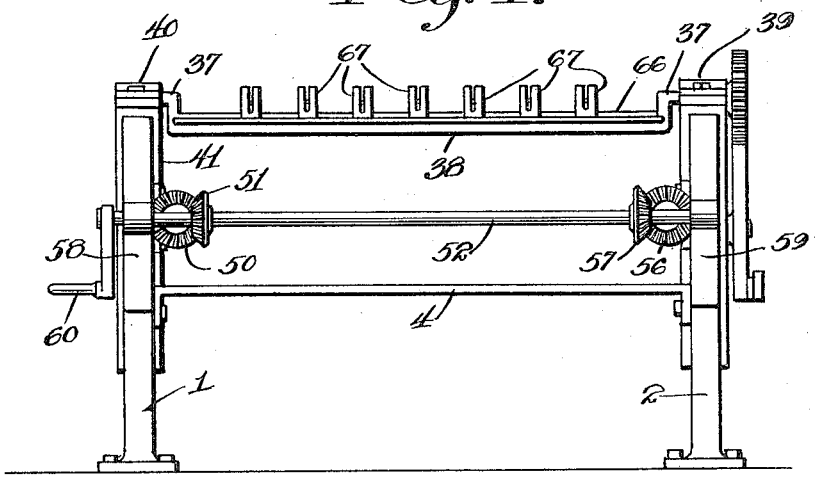

In the drawings:—Figure 1 is a plan view of a machine illustrating one form of my invention, and showing a grille structure in place before the grille wires are anchored. Fig. 2 is a side elevation thereof. Fig. 3 is a view in front elevation. Fig. 4 is a view in rear elevation. Fig. 5 is a longitudinal vertical sectional view of the machine. Fig. 6 is an enlarged sectional view of one of the grille jaws for attaching the grille wires. Fig. 7 is a perspective view thereof.

Like characters of reference designate similar parts throughout the different figures of the drawings.

As illustrated, the machine of my invention includes a frame having side members 1 and 2 which are suitably connected by transversely disposed braces 3 and 4.

The side frame members 1 and 2 have forwardly extending bearing arms 5 and 6 in which a driving shaft 7 is journaled.

The driving shaft 7 is provided with a pulley 8 and a clutch device comprising fixed and loose clutch members 9 and 10, respectively, carried by the shaft 7.

An operating lever 11, pivotally mounted at 12, is connected with the movable clutch member 10, at 13, so that by depressing the free end of the lever the clutch member 10 can be moved into clutch relation with the clutch member 9.

Operating cranks or disks 14 and 15 are mounted on drive shaft 7 and each is provided with a radially adjustable wrist pin, indicated at 16 and 17. The disk 14 is slotted, as indicated at 18 and the disk 15 is slotted as indicated at 19, for radial adjustment of the pins 16 and 17.

Crank rod 20 connects disk 14 with a toothed segment 21 which is mounted upon frame member 1 to rotate about stud shaft 22.

The segment 21 is provided with an arm 23 which is connected with the crank rod 20 as indicated at 24. The segment 21 meshes with a pinion 25 which is mounted upon a jaw-carrying shaft having a main body portion 26 which is cranked or offset with respect to its ends 27. The ends 27 are journaled in bearings 28 and 29, mounted upon side frame members 1 and 2, respectively.

The arrangement is such that one revolution of the crank disk 14 will oscillate the jaw-carrying shaft 26 throughout less than one complete circle in a contra-clockwise direction and then back to the original position.

Crank disk 15 is connected by a crank rod 30 with an arm 31 of a toothed segment 32 which is mounted upon a stud shaft 33. By reason of the fact that stud shaft 33 is mounted upon a carriage, which will presently be described, I slot the rod 30, at 34, for adjustable connection with the arm 31 by a pin 35. Toothed segment 32 meshes with a pinion 36 mounted on one of the ends 37 of a jaw-carrying shaft 38. The jaw-carrying shaft 38, or rather its ends 37, are journaled in bearings 39 and 40 mounted upon carriages 41 and 42. Carriages 41 and 42 are slidable upon upper and lower bars 43 and 44 of the frame 1, and 45 and 46 of the frame member 2, respectively.

Carriage 41 is provided with a nut 47 having threaded engagement with an adjusting screw 48 which is rotatably but longitudinally immovably mounted in bearing 49 on side frame member 1. A bevel gear 50 is mounted on the end of said adjusting screw 48 and meshes with a bevel gear 51 on an adjusting shaft 52.

Carriage 42 is provided with a nut 53 through which an adjusting screw 54 has threaded engagement and the screw 54 is rotatably but not longitudinally movable in a bearing 55, carried by the side frame member 2.

On the end of the adjusting screw 54 I mount a bevel gear 56 which meshes with a bevel gear 57, mounted on adjusting shaft 52. Adjusting shaft 52 is mounted in bearings 58 and 59 in the side frame members 1 and 2, respectively. A crank 60, on the end of the adjusting shaft 52 affords means for turning the adjusting screws 48 and 54 to adjust the carriages 41 and 42 longitudinally on the frame toward or from jaw shaft 26 to accommodate work of different sizes. The slot 34 in the rod 30, provides for adjustment of connection of the pin 35 when the carriage 42 is adjusted.

It will now be seen that I have provided means for oscillating the jaw shafts 26 and 38 from a lower position toward each other, and then back again to the position shown in Fig. 1, to operate simultaneously on opposite ends of each of the grille rods or wires running in one direction with respect to the grille structure.

I will now describe the construction of the jaws carried by said shafts and the manner in which the same operate, and as all the jaws of both shafts are similar in construction and operation, only one need be described in detail.

In the application of the machine shown, I have illustrated a grille structure which comprises a surrounding frame having side portions 60 and 61, the frame being illustrated as being square in form. The grille work comprises interlaced and transversely disposed wires 62 and 61' of such length as to extend over or beyond the frame when first made up, and disposed as shown in Fig. 1. The purpose of the machine is to grasp the projecting ends of the grille wires and wrap the same about the side members of the frame so as to form a grille structure. I provide one support, indicated at 63, and mounted on carriages 41 and 42, for supporting one portion of the grille structure and a support 64 mounted on frame sides 1 and 2 for supporting the other portion of the grille structure.

As shown more particularly in Figs. 6 and 7, the bending or winding jaws are provided with dove-tailed bases, as indicated at 65, and the jaw-carrying shafts at their cranked or offset member portions are polygonal in cross-section and are provided with dove-tails 66 on which the jaws 67 may be adjusted in accordance with the distance between the grille wires, the dove-tail connection serving to firmly anchor the jaws upon the shafts in any desired position. Any suitable means may be provided to anchor the jaws against longitudinal movement on the shaft after the jaw has been set. The jaw 67 is bifurcated with the crotch of the bifurcation taking the form indicated by lines 68 and 69 which incline upwardly toward a central portion of the jaw. The bifurcated or jaw portions 70 are spaced apart from each other and are bent to form hooks 71, the centers of which coincide with the axis of rotation of the journal ends of the shafts, as will be seen more particularly by reference to Fig. 5. The jaws 67 extend horizontally, at 72, inwardly from the hook, as will be clearly seen by reference to Figs. 6 and 7. The hooks 71 are proportioned so as to grasp the side members 60 or 61 of the grille frame and the arrangement is such that opposite sides will be grasped by opposing jaws, as indicated in Fig. 1, and as the frame is supported in position at 63 and 64, it will be held by the jaws against lateral movement on the supports while the terminal ends of the grille wires or rods are being bent about the frame members. When the opposite side portions are disposed in the hooks 71, the grille rods will extend below the side frame members and outwardly between the jaw members 70. Outwardly with respect to the centers of the hooks 71, I insert a wearing bending pin 73 through a bore 74 extending transversely through the jaw 67. The disposition of the wearing pins 73 is preferably at the apex of the crotch walls 68 and 69 and below the center of the hooks 71 sufficiently to permit the initially straight grille rod to pass over the wearing pins 73 and below the side member with which it is to be connected.

It will now be clearly evident that when the jaw-carrying shaft 38, or the crank portion thereof, is rotated about the center of the hooks of the jaw, as indicated at 71, that the wearing or bending pin 73 will carry the projecting end of the grille wire about the side member in a manner to completely encircle the latter with the end of the grille rod or wire. Movement to each of the shafts, simultaneously, in the present construction, is imparted to an extent to bend the terminal end of the grille rod or wire substantially once around the side member to which it is to be attached.

It will be clear that one jaw of one shaft will grip one end of one of the wires and that a jaw on the other shaft will grip the other end of such wire so that both ends of each wire will be simultaneously bent about and into anchoring relation with the respective sides of the grille frame. Thus there will be no tendency of the wire to slacken, but on the other hand, the wire will be tensioned and firmly held in place to form a relatively rigid grille work after its terminal ends have been bent about the grille frame.

I also converge the jaws 70, from their upper portions to point 75, so that there will be a frictional gripping action laterally with respect to the grille wire projecting between the jaws 70.

After the wires of opposite sides have been wound about opposite members of the grille frame, then the structure is turned about to present the remaining ends for operation by the machine so that in the construction shown, two operations will serve to completely unite all of the transversely disposed grille wires to the frame to form a rigid grille structure.

One of the special utilities of the device of my invention is to make grille shelves for a refrigerator but it will be understood that the device of my invention is capable of anchoring the ends of grille wires or rods about a grille frame of any character.

While I have herein shown and described one specific form of my invention, I do not wish to be limited thereto except for such limitations as the claims may import.

I claim—

1. In a machine for anchoring the terminals of grille rods or wires to a grille frame, means for supporting a grille frame with the grille rods or wires below the frame, jaw devices for engaging opposing sides of the frame and opposite ends of the wires or rods, and means for moving said devices about the frame portions engaged thereby as axes to bend the ends of the wires or rods about said frame portion, substantially as described.

2. In a machine for anchoring the terminals of grille rods or wires to a grille frame, means for supporting the frame with the grille rods or wires below the frame, jaw devices for engaging opposing sides of the frame and opposite ends of the wires or rods, and means for moving said devices about the frame portions engaged thereby as axes to simultaneously bend each end of the wires or rods about said frame portions, substantially as described.

3. In a machine for anchoring the terminals of grille rods or wires to a grille frame, means for supporting the frame and grille rods or wires, jaw devices for engaging opposing sides of the frame and opposite ends of the wires or rods, and means for moving said devices about the frame portions engaged thereby as axes to bend the ends of said wires or rods about said frame portions, substantially as described.

4. In a machine for anchoring the terminals of grille rods or wires to a grille frame, devices for engaging the opposing sides of the frame and opposite ends of the wires or rods, and means for moving said devices about the frame portions engaged thereby as axes to bend the ends of said wires or rods about said frame, substantially as described.

5. In a machine for anchoring the terminals of grille rods or wires to a grille frame, devices engaging opposing sides of the frame and opposite ends of the wires or rods, and means for moving said devices toward each other and about the frame portions engaged thereby as axes to bend the ends of said wires or rods about said frame portions, substantially as described.

6. In a machine for anchoring the terminals of grille rods or wires to a grille frame, devices engaging the sides of the frame and opposite ends of the wires or rods, and means for moving said devices about the frame portions adjacent thereto to bend the ends of the wires or rods into anchored relation therewith, substantially as described.

7. In a machine for anchoring the terminal ends of grille rods or wires to grille frames, devices for engaging portions of the frame and opposite ends of the wires, and means for moving said devices about the frame portions engaged thereby throughout less than a complete circle to bend the ends of said wires about said frame portions, substantially as described.

8. In a machine for anchoring the terminal ends of grille rods or wires to grille frames, means to support the frame, a jaw device having a hook portion for engagement with the sides of the frame and a wearing pin for engagement with the wire, and means for moving the jaw device about said frame in that portion engaged thereby as an axis and with said pin in engagement with said wire to bend the latter about said frame, substantially as described.

9. In a machine for anchoring the terminal ends of grille rods or wires to grille frames, means to support the frame in the proper relation, a jaw device having a hook portion for engagement with the sides of the frame and a bending portion for engagement with the wire at a point between the jaws of said device, and means for moving the jaw device about said frame member as an axis with the hook portion in engagement therewith and with the bending portion in engagement with said wire to bend the latter about the frame, substantially as described.

10. In a machine for anchoring the terminal ends of grille rods or wires to grille frames, means to support and hold the frame in the proper relation, a jaw having bifurcated portions for receiving the wire therebetween and said portions being hooked to engage over the side members of said frame, a removable pin disposed between said portions to hold the wire against said frame, and means for turning said device about the portions of said frame engaged thereby as an axis to cause said pin to carry the wire in close relation about said frame, substantially as described.

11. As a means for anchoring the end of a wire to a rod, a device having a bifurcated portion for receiving the wire therebetween and the latter being hook-shaped to engage the rod, a removable pin disposed between said portions to hold the wire against the rod, and means for turning said device about the portion of said rod engaged thereby to cause said pin to bend the wire about said rod, said pin being disposed at one side of said hook portion and in advance thereof with respect to the direction of movement of said device, substantially as described.

12. In a machine for anchoring the terminal ends of grille rods or wires about a grille frame, means to support the grille frame in the proper relation, means adapted to engage with the opposite sides of the frame and the opposite ends of the grille wires, and mechanism for moving said means about said rods as axes to bend and wrap the wires in anchored relation about the frame, substantially as described.

13. In a machine for anchoring the terminal ends of grille rods or wires about a grille frame, a jaw-carrying shaft cranked or offset with respect to its axis of rotation, jaws mounted on the offset portion of said shaft for engaging the end of said rods or wires and having hook portions for engaging the frame proportioned to disclose the center of the hook portions coincident with the axis of rotation of the shaft, and means for imparting rotative movement to the shaft to carry the ends about said frame and in bent anchored relation with respect thereto, substantially as described.

14. In a machine for anchoring the terminal ends of grille rods or wires to a grille frame, a jaw-carrying shaft cranked or offset with respect to its axis of rotation, jaws dovetailed on the offset portion of said shaft and engaging the ends of said rods or wires and having hook portions for engaging the frame and proportioned to dispose the center of the hook portions coincident with the axis of rotation of said shaft, and means for rotating the shaft to bend the wires about said frame, substantially as described.

15. In a machine for anchoring the terminal ends of grille wires or rods about a grille frame, opposing sets of devices for engaging opposite ends of the wires, means for imparting rotative movement to said sets to bend the ends about the frame, and means for adjusting one set relatively to the other for different sized frames, substantially as described.

16. In a machine for anchoring the terminals of grille wires or rods about a grille frame, a frame, opposing sets of devices for engaging opposite ends of the wires, means for rotatively mounting one set upon the frame, mechanism slidable on the frame for supporting the other set of devices, means for imparting rotative movement to said sets of devices to bend the ends of the wires about the frame, and means for adjusting the said mechanism to alter the distance between said sets, substantially as described.

17. In a machine for anchoring the terminal ends of grille wires or rods about a grille frame, opposing sets of devices for engaging opposite ends of the wires, oscillatory devices for imparting movement to said wire-engaging devices throughout part of a circle and to return said devices to a normal position, and rotative means for actuating said oscillating devices, substantially as described.

In testimony whereof I affix my signature in presence of two witnesses.

FRANK A. KORLASKY.

Witnesses:
P. L. ROGERS,
E. H. ERDMAN.

Copies of this patent may be obtained for five cents each, by addressing the "Commissioner of Patents, Washington, D. C."